UNITED STATES PATENT OFFICE.

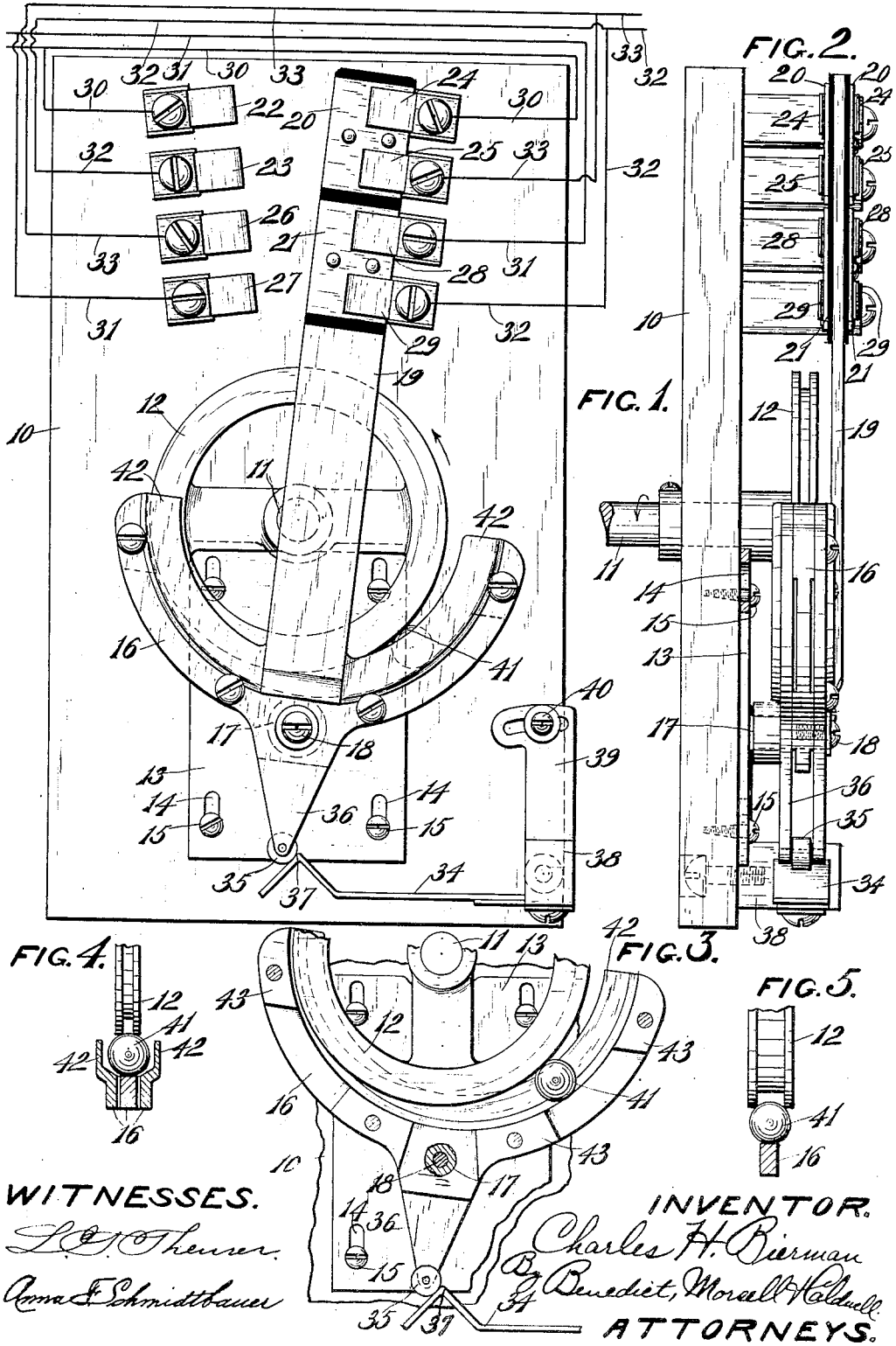

CHARLES H. BIERMAN, OF MILWAUKEE, WISCONSIN.

AUTOMATIC SWITCH.

No. 921,666.  Specification of Letters Patent.  Patented May 18, 1909.

Application filed December 30, 1908. Serial No. 470,027.

*To all whom it may concern:*

Be it known that I, CHARLES H. BIERMAN, residing in Milwaukee, in the county of Milwaukee and State of Wisconsin, have invented new and useful Improvements in Automatic Switches, of which the following is a description, reference being had to the accompanying drawings, which are a part of this specification.

This invention has for its object to provide an automatic switch, such as for changing the polarity of an electrical circuit with the change in direction of movement of a driving mechanism, being particularly designed for car lighting systems employing storage batteries charged from an axle driven generator and then serving to reverse the polarity of the generator circuit upon a change in the direction of movement of the car and thereby correct the reversal of polarity of the generator circuit which would result from the change in its direction of rotation and in this manner maintain the same direction of current flow in the charging circuit whatever the direction of movement of the car may be.

As the direction of current flow from the generator changes with a change in the direction of rotation of its armature, and a change in direction of current flow in a charging circuit of a storage battery system would result in depleting the storage battery instead of charging the same, it is obvious that a means for reversing the circuit connections, in the form of a pole changer, is necessary to the proper operation under such conditions. When the generator is driven from a car axle, as in car lighting systems, an automatic pole changer dependent in its position upon the direction of movement of the car is highly desirable.

The present invention is designed to automatically reverse the connections of the charging circuit in such a system so as to correct the reversal of polarity due to the change of direction of rotation of the generator armature and thereby maintain a constant direction of flow of the charging current, whatever the direction of movement of the car may be. While this is the primary object of the invention it is capable of other uses.

With the above and other objects in view the invention consists in the automatic switch herein described and claimed, its parts and combinations of parts and all equivalents.

I desire it to be understood that this invention is not limited to any specific form or arrangement of parts except in so far as such limitations are specified in the claims.

Referring to the accompanying drawings in which like characters of reference indicate the same parts in the different views; Figure 1 is a front elevation of an automatic switch embodying the present invention showing in diagram a method of changing circuit connections thereby to constitute a pole changer; Fig. 2 is a side elevation thereof with the near row of contacts removed; Fig. 3 is a fragmental view similar to Fig. 1 with parts of the rocking member removed to more clearly show the relation of the coöperating active parts; Fig. 4 is a detail sectional view through the rocking member showing the position of the ball between the rocking member and the wheel; and, Fig. 5 is a similar view of a modified form of the device.

In these drawings 10 indicates a base which may be of any suitable insulating material and 11 is a shaft passing therethrough and carrying a grooved wheel 12 at the front of the base. The shaft 11 may be either the generator shaft of a car lighting system or one having driving connection therewith so as to receive rotation from and change its direction of rotation with the car wheels. A plate 13 is slidably mounted in any desirable manner, as by having elongated slots 14 fitting on screws 15 which project from the face of the base, and has pivotally mounted on it a rocking member 16, the latter preferably fitting loosely upon a stud 17 projecting from the plate with a screw 18 threading in the stud and holding the rocking member in place. Any suitable means may be provided to be actuated by the rocking movement of the rocking member 16, for causing a change in the connections of a charging circuit of a storage battery system, for instance, so as to reverse the polarity thereof. Such means as here shown comprise a switch arm 19 carried by the rocking member and supporting pairs of opposite insulated contact plates 20 and 21 respectively, the former to engage with spring contacts 22 and 23 in one position of the arm and with spring contacts 24 and 25 in the other position of the arm, and the latter to engage with spring contacts 26 and 27 in the first position of the arm and with spring contacts 28 and 29 in the second position of the arm. The wiring diagram of Fig. 1 shows the spring contacts 22 and 24 connected with one of the generator terminals 30 and the spring contacts 27 and 28 connected with the other generator terminal 31 and the spring contacts 23 and 29 connected with one of the storage battery terminals 32 and the spring contacts 26 and 25 connected with the other storage battery terminal 33. In the position of the switch arm 19 shown in Fig. 1 the contact plate 20 causes the battery terminal 33 to take the same polarity as the generator terminal 30, whereas in the other position of the switch arm this same contact plate 20 causes the other battery terminal 32 to take the polarity of the generator terminal 30, the contact plate 21 in each instance giving the other battery terminal the polarity of the other generator terminal.

That form of means for reversing terminal connections shown and described is not essential to the operation of this invention and may be substituted by any other capable of performing the desired functions.

The sliding plate 13 with its rocking member 16 is given a spring pressure to normally tend to move it toward the shaft 11, while the rocking member is held in either of its two positions with spring pressure so that a change of the switch arm 19 from one position to the other will be quickly effected and the switch will have the advantages of a quick make and break of the electrical connections. Those two spring actions may desirably be accomplished by means of a single spring member 34 bearing on a roller 35 carried by a projecting lug or pair of lugs 36 on the rocking member, the spring member being given an angular bend at 37 over which the roller must ride in order that the rocking member may move from one position to the other to change the connections of the switch arm. By means of this arrangement the roller 35 bears on one incline of the spring member 34 in one position of the switch arm and on the other incline thereof in the other position of the switch arm, and by the cam action of such inclines the switch arm is pressed tightly within its spring contacts in either position while the entire mechanism mounted on the sliding plate 13 is pressed toward the shaft 11. As a convenient means for varying the pressure exerted by the spring member 34 it is carried by a post 38 which is pivotally mounted on the base and has a slotted arm 39 held by an adjusting screw 40 in any angular position to which it may be turned to increase or reduce the pressure of the spring member against the roller.

The actuating means for causing the movement of the rocking member from the rotating wheel 12 consists of a wedge member between them, preferably in the form of a roller or ball 41, which in one position of the rocking member will freely permit of the turning of the wheel 12 in one direction without opposition thereto and without affecting the rocking member, but upon a reversal of the direction of movement of the wheel will be drawn in between the periphery of the wheel and the rocking member to act as a wedge and first force the rocking member against its spring action away from the shaft 11 and upon passing to the other side of the line between the shaft 11 and the pivotal connection of the rocking member will throw said rocking member to its other position. In either position of the switch arm the ball 41 is in such a position that it is unaffected by the wheel 12 as long as the wheel rotates in the direction which caused the ball to move to said position, but on the reversal of the motion of the wheel the ball is rolled thereby into the contracting space between the wheel and the rocking member and forces the plate 13 to slide downwardly away from the shaft 11 and against the action of the spring member 34, and finally as the ball passes to the other side of the line between the shaft and the pivotal connection of the rocking member and its wedging effect upon the rocking member becomes sufficiently great it throws the rocking member to its other position by forcing the roller over the angular projection of the spring member 34. This movement of the rocking member causes an instantaneous throw of the switch arm from one position to the other to effect the change in polarity of the circuit connections and counteract the change in polarity of the generator terminals and thereby maintain the same direction for the charging current with either direction of movement of the car.

The rocking member is preferably arc shaped as shown to hold the ball in a sort of a tapering pocket between it and the periphery of the wheel in either position of the device, the weight of the ball serving to keep it in contact with both of these members at all times. The groove in the periphery of the wheel 12 serves to confine the movements of the ball to a fixed path on the rocking member, though the rocking member, as shown, is constructed with side flanges 42 to form a trough between them for preventing the ball being jarred out of place. The rocking member may be made up of three pieces bolted together, the two outer pieces forming the flanges 42 and the lugs 36 while the intermediate member forms the bearing surface for the ball, as shown in Fig. 4, and is provided with projections 43 to allow for spaces between it and the side pieces through which dust or dirt may pass to prevent its accumulating in the trough-like race-way for the ball. Obviously the side flanges 42 may be dispensed with by widening the groove of the wheel 12 as shown in Fig. 5.

From the foregoing it will be understood that the present invention affords a sensitive though quick and positive acting automatic pole changer for reversing the polarity of a circuit upon the reversal of direction of motion of some such means as the driving mechanism of a generator for storage battery or lighting systems, though it may be adapted for various other purposes.

It is obvious that the switch arm may extend in any direction whatever without affecting the operation of the invention and that the rocking member may have the form of a ring surrounding the wheel if desired. It is also obvious that the switch of this invention is particularly suitable for use as a snap switch for general purposes, the shaft thereof serving as a key and a turn thereof in one direction causing the switch to close while a turn in the opposite direction causes the switch to open. The feature of opening or closing the circuit according to the direction the key is turned is one which permits of the condition of the switch being known by the operator when it is impossible for him to note the effect produced thereby. Such uses of the structure are within the scope of the present invention. It is furthermore apparent that various departures may be made from the construction as shown and described without departing from the scope of the invention.

What I claim as my invention is;

1. An automatic switch for operation upon the reversal of direction of movement of a moving body, comprising a wheel to receive motion from said moving body, a pivoted member, a wedge fitting between the pivoted member and the wheel and bearing against both of them, the bearing surfaces of the pivoted member and the wheel converging downwardly whereby the wedge freely permits the wheel to turn in one direction, but is carried with the wheel and forced between it and the pivoted member to cause the pivoted member to swing when the wheel turns in the other direction, and a switch member connected with the pivoted member.

2. An automatic switch for operation upon the reversal of direction of movement of a moving body, comprising a wheel to receive motion from said moving body, a pivoted member, a roller fitting between the pivoted member and the wheel and bearing against both of them, the bearing surfaces on the pivoted member and the wheel converging downwardly whereby the roller freely permits the wheel to turn in one direction, but is carried with the wheel and forced between it and the pivoted member to cause the pivoted member to swing when the wheel turns in the other direction, and a switch member connected with the pivoted member.

3. An automatic switch for operation upon the reversal of direction of movement of a moving body, comprising a wheel to receive motion from said moving body, a rocking member, a ball fitting between the rocking member and the wheel and bearing against both of them, the bearing surfaces on the pivoted member and the wheel converging downwardly whereby the ball freely permits the wheel to turn in one direction but is carried by the wheel on the rocking member to cause the rocking member to swing to its other position when the wheel turns in the opposite direction, and a switch member connected with the rocking member.

4. An automatic switch for operation upon the reversal of direction of movement of a moving body, comprising a wheel for receiving motion from said moving body, a plate mounted to yield in a direction away from the wheel, a rocking member pivotally mounted on the plate, a ball fitting between the rocking member and the wheel and bearing against both of them, the bearing surfaces on the pivoted member and the wheel converging downwardly whereby the ball freely permits the wheel to turn in one direction but is rolled by the wheel on the rocking member to cause the rocking member to swing to its other position when the wheel turns in the opposite direction, and a switch member connected with the rocking member.

5. An automatic switch for operation upon the reversal of direction of movement of a moving body, comprising a wheel for receiving motion from said moving body, a rocking member, a ball fitting between the rocking member and the wheel and bearing against both of them, the bearing surfaces on the pivoted member and the wheel converging downwardly whereby the ball freely permits the wheel to turn in one direction but is rolled by the wheel on the rocking member to cause the rocking member to swing to its other position when the wheel turns in the opposite direction, a projection carried by the rocking member, an angular spring bearing on the projection to serve as a cam for holding the rocking member in either of its positions with pressure, and a switch member connected with the rocking member.

6. An automatic switch for operation upon the reversal of direction of movement of a moving body, comprising a wheel for receiving motion from said moving body, a plate mounted to yield in a direction away from the wheel, a rocking member pivotally mounted on the plate, a ball fitting between the rocking member and the wheel, and bearing against both of them, the bearing surfaces on the pivoted member and the wheel converging downwardly whereby the ball freely permits the wheel to turn in one direction but is rolled by the wheel on the rocking member to cause the rocking member to swing to its other position when the wheel turns in the opposite direction, a projection carried by the rocking member, a roller mounted on the projection, an angular spring bearing on the roller to serve as a cam for holding the rocking member in either of its positions with pressure, and a switch member connected with the rocking member.

7. An automatic switch for operation upon the reversal of direction of movement of a moving body, comprising a wheel receiving motion from said moving body, a plate slidably mounted to yield in a direction away from the wheel, a rocking member pivotally mounted on the plate, there being a groove in the periphery of the wheel, a ball fitting within the groove of the wheel and between said wheel and the rocking member with a bearing against the wheel and the rocking member, the bearing surfaces on the rocking member and the wheel converging downwardly whereby the ball freely permits the wheel to turn in one direction but is rolled by the wheel on the rocking member to cause the rocking member to swing to its other position when the wheel turns in the opposite direction, a projection carried by the rocking member, an angular spring bearing on the projection to serve as a cam for holding the rocking member in either of its positions with pressure and pressing the sliding plate toward the wheel, and a switch member connected with the rocking member.

8. An automatic switch for operation upon the reversal of direction of movement of a moving body, comprising a wheel for receiving motion from said moving body, a plate slidably mounted to yield in a direction away from the wheel, a rocking member pivotally mounted on the plate, there being a groove in the periphery of the wheel, a ball fitting within the groove of the wheel and between said wheel and the rocking member with a bearing against both the wheel and the rocking member, the rocking member being of an arc shape and having side flanges to prevent the ball losing its position, the bearing surfaces of the pivoted member and the wheel converging downwardly whereby the ball permits the wheel to turn in one direction but is rolled by the wheel on the rocking member to cause the rocking member to swing to its other position when the wheel turns in the opposite direction, a projection carried by the rocking member, an angular spring bearing on the projection to serve as a cam for holding the rocking member in either of its positions with pressure and pressing the sliding plate toward the wheel, and a switch member connected with the rocking member.

9. An automatic switch for operation upon the reversal of direction of movement of a moving body, comprising a base, a wheel mounted on the base for receiving motion from the moving body, a plate slidably mounted on the base, a rocking member pivotally mounted on the plate, a ball fitting in the space between the wheel and the rocking member with a bearing against both the wheel and the rocking member, the rocking member being of an arc shape and comprising three parts secured together, the intermediate part forming the bearing for the ball and the side parts forming side flanges to keep the ball in place, there being spacing lugs between the parts of the rocking member to prevent the accumulation of dust therein, lugs formed by projections of the side plates of the rocking member, a roller journaled between the lugs, a post pivotally mounted on the base, means for locking the post in its pivotal adjustments, an angular spring carried by the post and bearing on the roller to serve as a cam for holding the rocking member in either of its positions with pressure and to serve as a means for pressing the sliding plate toward the wheel, and a switch member carried by the rocking member.

10. A switch, comprising a rotary member, a pivoted member, a wedge fitting between the pivoted member and the rotary member and bearing against both of them, the bearing surfaces of the pivoted member and the rotary member converging downwardly whereby the wedge freely permits the rotary member to turn in one direction, but is carried by the rotary member and is forced between it and the pivoted member and to cause the pivoted member to swing when the rotary member turns in the other direction, and a switch member connected with the pivoted member.

11. A switch, comprising a rotary member, a movable member, a wedge fitting between the movable member and the rotary member and bearing against both of them, the bearing surfaces of the movable member and the rotary member converging in either position of the movable member, whereby the wedge freely permits the rotary member to turn in one direction but is carried by the rotary member and is forced between it and the movable member to cause the movable member to change its position when the rotary member turns in the other direction, and a switch member actuated by the movable member.

12. A switch, comprising a rotary member, a yieldingly mounted movable member, a wedge fitting between the movable member and the rotary member and bearing against both of them, the bearing surfaces of the movable member and the rotary member converging in either position of the movable member, whereby the wedge freely permits the rotary member to turn in one direction but is carried by the rotary member and is forced between it and the movable member to cause the movable member to change its position when the rotary member turns in the other direction, and a switch member actuated by the movable member.

In testimony whereof, I affix my signature, in presence of two witnesses.

CHARLES H. BIERMAN.

Witnesses:
R. S. C. CALDWELL,
ANNA F. SCHMIDTBAUER.